United States Patent
Thomas (12) United States Patent (10) Patent No.: US 9,694,289 B2
(45) Date of Patent: Jul. 4, 2017

(54) CHESS VARIANT GAME AND METHOD

(71) Applicant: Elgin Delome Thomas, Smyrna, GA (US)

(72) Inventor: Elgin Delome Thomas, Smyrna, GA (US)

(*) Notice: Subject to any disclaimer, the term of this patent is extended or adjusted under 35 U.S.C. 154(b) by 268 days.

(21) Appl. No.: 14/403,087

(22) PCT Filed: May 22, 2013

(86) PCT No.: PCT/US2013/042318
§ 371 (c)(1),
(2) Date: Nov. 21, 2014

(87) PCT Pub. No.: WO2013/177343
PCT Pub. Date: Nov. 28, 2013

(65) Prior Publication Data
US 2015/0174495 A1    Jun. 25, 2015

Related U.S. Application Data

(60) Provisional application No. 61/688,771, filed on May 22, 2012.

(51) Int. Cl.
*G06F 17/00* (2006.01)
*A63F 13/822* (2014.01)
*A63F 3/02* (2006.01)
*A63F 3/00* (2006.01)

(52) U.S. Cl.
CPC .............. *A63F 13/822* (2014.09); *A63F 3/02* (2013.01); *A63F 2003/00186* (2013.01); *A63F 2003/00842* (2013.01); *A63F 2003/00996* (2013.01)

(58) Field of Classification Search
USPC ............ 463/1, 9, 14, 15; 273/236, 241, 242, 273/255, 260–262
See application file for complete search history.

(56) References Cited

U.S. PATENT DOCUMENTS

| | | |
|---|---|---|
| 3,843,130 A | 10/1974 | Whitney |
| 4,037,843 A | 7/1977 | Hoffman |
| 4,067,578 A | 1/1978 | Chang |
| 4,147,360 A | 4/1979 | Bailey |
| 4,708,349 A | 11/1987 | Shomer |
| 4,778,187 A | 10/1988 | Deak |

(Continued)

*Primary Examiner* — Ronald Laneau
(74) *Attorney, Agent, or Firm* — Lance M. Pritikin (57) ABSTRACT

An exemplary embodiment of a chess game variant comprises a game board and four sets of eighteen chess pieces each. The game board has an inner zone and four panel zones thereabout. The inner zone presents eighty-one playing positions in a nine-by-nine square array. Each panel zone presents twenty-seven playing positions arranged in a three-by-nine rectangular array. The board includes universal rows which adapt for chess-like play on an unbalanced board. Each set of game pieces include institutional pieces and citizen pieces. Most of the citizen pieces are matched in status with corresponding institutional pieces, and are subject to rules of promotion which are driven, in part, by these status relationships. Most of the game pieces include covert or overt markings, which also drive game play and strategy. In certain aspects of game play, a player may take control of the game pieces of one or more opposing players.

6 Claims, 6 Drawing Sheets

(56) References Cited

U.S. PATENT DOCUMENTS

| | | |
|---|---|---|
| 5,125,666 A | 6/1992 | Adams |
| 5,513,849 A | 5/1996 | Navin |
| 5,570,887 A | 11/1996 | Christie |
| 5,586,762 A | 12/1996 | Wearley |
| 5,690,334 A | 11/1997 | Duke |
| 5,803,457 A | 9/1998 | Smith |
| 5,901,957 A | 5/1999 | Leyva et al. |
| 6,116,602 A | 9/2000 | McLoy |
| 6,336,632 B1 * | 1/2002 | London .................. A63F 3/02 273/261 |
| 6,446,966 B1 | 9/2002 | Crozier |
| 6,481,716 B2 * | 11/2002 | Trice ................ A63F 3/00176 273/242 |
| 6,550,770 B1 * | 4/2003 | Rackliff ............. A63F 3/00176 273/261 |
| 6,702,287 B1 | 3/2004 | Pendexter |
| 6,799,763 B2 | 10/2004 | Grady |
| 7,063,323 B1 | 6/2006 | Khodabandeh |
| 7,410,418 B2 | 8/2008 | Potter |
| 7,434,806 B2 * | 10/2008 | Budden .................. A63F 3/02 273/255 |
| 7,749,058 B2 * | 7/2010 | Kershaw ............ A63F 3/00643 273/236 |
| 2006/0279042 A1 * | 12/2006 | Stevenson ................ A63F 3/02 273/260 |
| 2008/0045343 A1 | 2/2008 | Sauberman |

* cited by examiner

CHESS VARIANT GAME AND METHOD

RELATED APPLICATIONS

This application is a U.S. National Stage of International Application No. PCT/US2013/042318 filed May 22, 2013, which claims the benefit of U.S. Provisional Application No. 61/688,771 filed May 22, 2012, the content of each of which are incorporated by this reference in their entireties for all purposes as if fully set forth herein.

TECHNICAL FIELD

The present invention relates generally to board and computer games. More particularly, the present invention relates to improvements in chess-type game kits and methods.

BACKGROUND

Precursors and variations of the game of chess have been played for over 1000 years. Examples of some relatively recent variations include four-player chess as described in U.S. Pat. No. 5,125,666, and those which introduce non-conventional pieces with specialized functions, such as the games described in U.S. Pat. No. 5,125,666. Many other variants are described at Chess Variants website www.chess-variants.org. What is needed is a chess variant which introduces further aspects of chance and game play strategy over the prior art.

SUMMARY

The present invention is directed to kits, methods and computer programs for playing a variant of the game of chess.

A game may comprise a game board and four sets of eighteen chess pieces. A game board may have a first axis, a second axis generally perpendicular thereto, an inner zone centered at the intersection of the first and second axes, a first pair of panel zones disposed along the first axis on opposing sides of the inner zone, and a second pair of panel zones disposed along the second axis on opposing sides of the inner zone. The inner zone may present eighty-one playing positions (for example, playing squares) in a square array. Each panel zone may present twenty-seven playing positions arranged in a three-by-nine rectangular array. The playing positions may extend along the first axis and second axis generally forming respective universal rows which intersect to divide the remaining playing positions into distinct quadrants. The playing positions within each quadrant alternate between having a first color and a second color in a checkerboard pattern. A majority of the playing positions within the universal rows define universal playing positions. Each universal playing position may have a first color portion, a second color portion and two universal color portions. A universal color portion of each universal playing position generally adjoins one of the universal color portions of at least one adjacent universal playing position.

Each set of game pieces may include a subset of institutional pieces and a subset of citizen pieces. Each subset of institutional pieces may include at least a government piece, an ideology piece, a media piece, a military piece, and a corporate piece. Each subset of citizen pieces may include at least an ambassador piece, a scholar piece, a reporter piece, an agent piece and an executive piece.

Each subset of institutional pieces includes one government piece, two ideology pieces, two media pieces, two military pieces and two corporate pieces. Each subset of citizen pieces includes one ambassador piece, two scholar pieces, two reporter pieces, two agent pieces and two executive pieces. Within each subset of institutional pieces, (i) one ideology piece, one media piece, one military piece and one corporate piece includes overt markings; and (ii) one ideology piece, one media piece, one military piece and one corporate piece includes covert markings. Within each subset of citizen pieces, (i) one scholar piece, one reporter piece, one agent piece and one executive piece includes overt markings; and (ii) one scholar piece, one reporter piece, one agent piece and one executive piece includes covert markings.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Referring now to the drawings, like reference numerals designate identical or corresponding features throughout the several views.

Preferred Game Kit Embodiments

Figure 1:
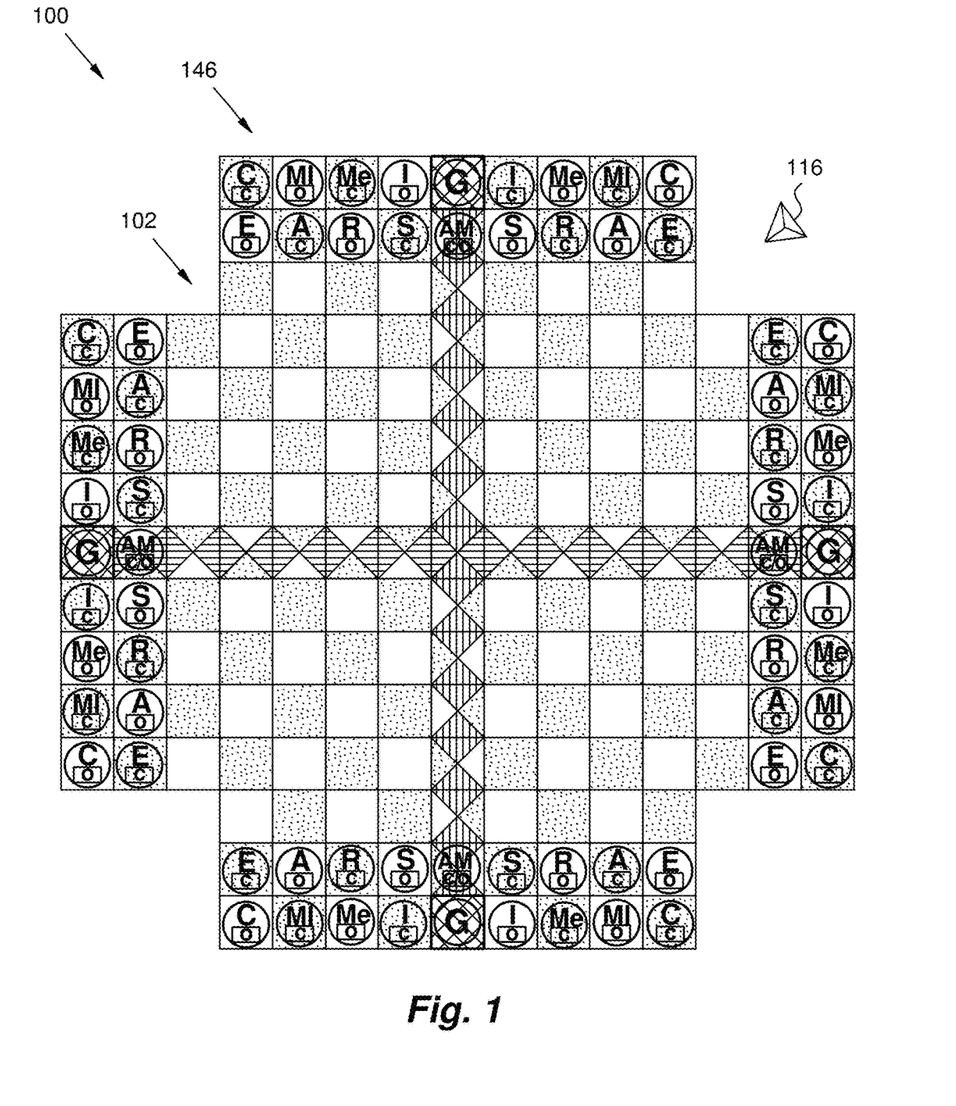
FIG. 1 is a diagrammatic view of one embodiment of a game kit in accordance with the present invention.
Figure 4:
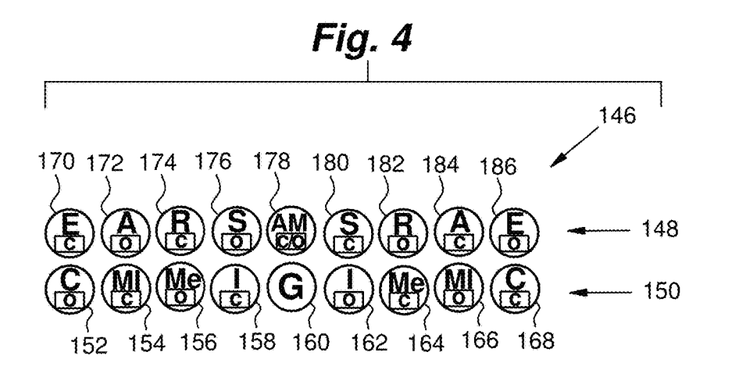
FIG. 4 is a diagrammatic view of one example of an individual player set of game pieces of various configurations, most or all of which may be characterized as either an institutional piece or a citizen piece.
Figure 7:
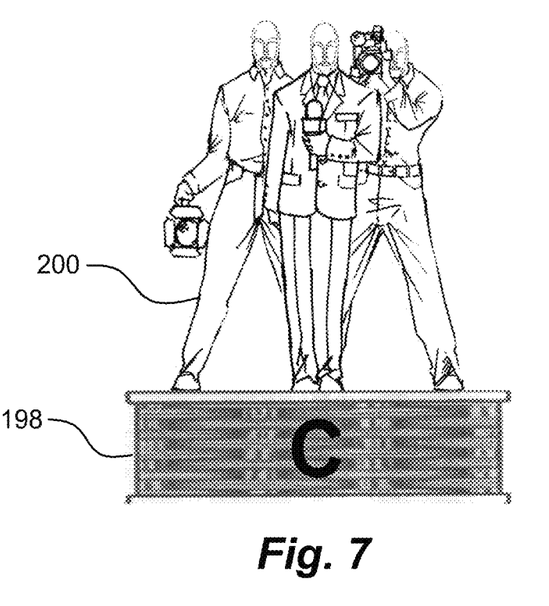
FIG. 7 is a diagrammatic view of one example of a media game piece (covert), illustrating the token portion and base portion of the game piece.

Embodiments of the game methods disclosed herein utilize a plurality of distinguishable sets of game pieces and additional elements and features which, particularly in combination, provide an increased level of strategic game play over traditional chess. Referring to FIG. 1, a game kit 100 may comprise a game board 102, a four-sided die 116, and 72 total game pieces (such as those shown at 146). Referring to FIG. 7 for example, each game piece may have a base portion 198 and a token portion 200 above the respective base portion. Referring to FIG. 4 for a depiction of one example of an individual set of game pieces 146, the game pieces may preferably be divided into four individual player 146 sets of 18 game pieces each. Each player set 146 may be distinguishable from the others by virtue of, for example, the use of different colors, finishes or materials between the four sets. Alternatively or in addition, the bases of each player set 146 may be shaped differently from each of the other three sets.

Referring again to FIG. 4, each player set 146 may include two categories of game pieces: institutional pieces 150 ("institutions") and citizen pieces 148 ("citizens"). The institutional pieces 150 may preferably come in five configurations: Government (identified in the figures by "G"), Ideology (identified by "I"), Media (identified by "Me"), Military (identified by "MI"), and Corporate (identified by "C"). Similarly, the citizen pieces 148 may preferably come in five configurations: Ambassador (identified by "AM"), Scholar (identified by "S"), Reporter (identified by "R"), Agent (identified by "A") and Executive (identified by "E"). Moreover, all game pieces except the Government and Ambassador pieces may preferably have the markings "C" or "O" on their base (or equivalent designations). These covert markings and overt markings designate whether the respective piece is considered Covert or Overt.

As illustrated in FIG. 4, a complete player set 146 may preferably include the following game pieces: Overt Corporate 152, Covert Military 154, Overt Media 156, Covert Ideology 158, Government 160, Overt Ideology 162, Covert Media 164, Overt Military 166, Covert Corporate 168, Covert Executive 170, Overt Agent 172, Covert Reporter 174, Overt Scholar 176, Ambassador 178, Covert Scholar 180, Overt Reporter 182, Covert Agent 184, and Overt Executive 186.

Figure 2:
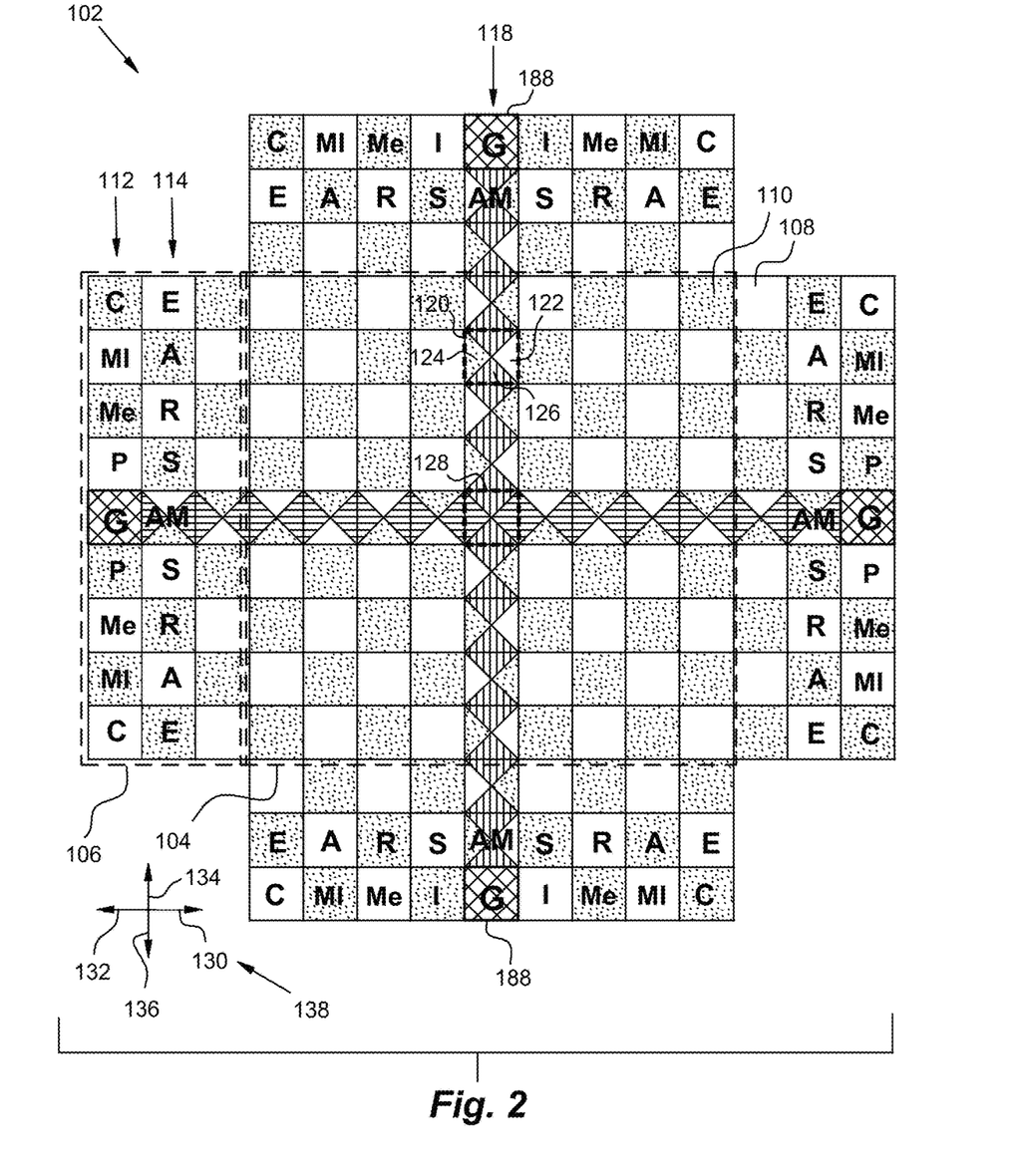
FIG. 2 is a diagrammatic view of one example of a game board in accordance with the present invention, particularly illustrating the composition of a board inner zone, four panel zones disposed thereabout, and a pair of universal rows.
Figure 3:
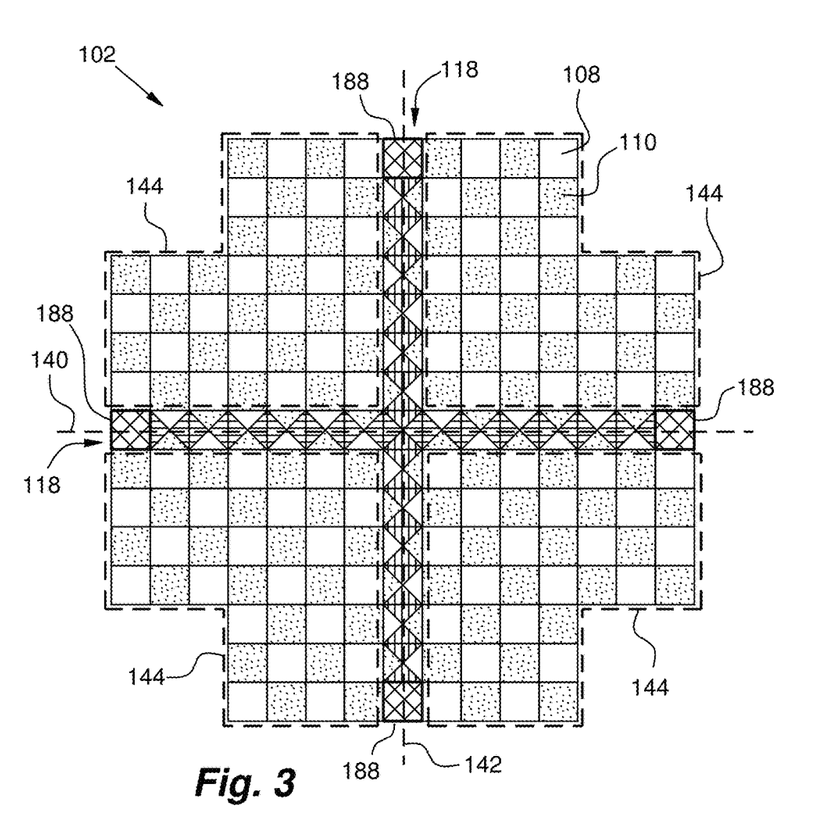
FIG. 3 is a diagrammatic view of one example of a game board similar to that shown in FIG. 2, but depicting the arrangement of four board quadrants defined in part by the pair of universal rows extending along respective axes.

Referring to FIGS. 2 and 3, in certain preferred embodiments a game board 102 includes a first axis 140 and a second axis 142, and may comprise an inner zone 104 and four panel zones (see, for example, first panel zone 106) disposed thereabout. The four panel zones are typically paired along respective axes on opposing sides of the inner zone 104. The inner zone 104 may preferably present eighty-one squares in a nine-by-nine configuration. The panel zones (such as the one at 106) may preferably present twenty-seven squares in a three-by-nine configuration. Certain of the squares on the game board 102 may define universal rows 118, which facilitate the traversal of game pieces on an unbalanced board. Referring to FIG. 3 for illustration, the universal rows 118 may intersect one another to divide substantially the entire game board 102 into four quadrants 144. The squares of each quadrant 144 may preferably alternate between, for example, light squares 108 and dark squares 110 in a checkered pattern.

Figure 5:
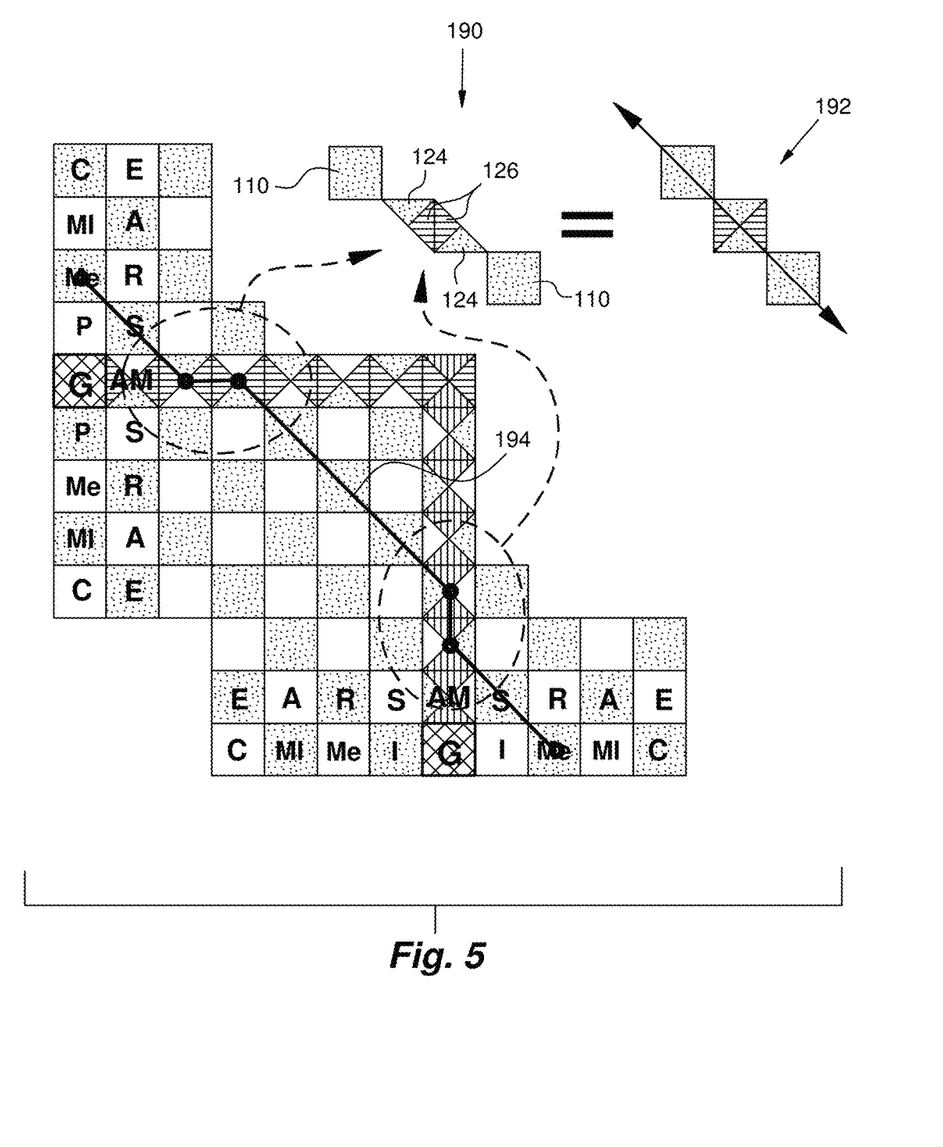
FIG. 5 is a diagrammatic view of one example of movement logic which may apply when a game piece traverses a portion of a universal row from a diagonal direction.
Figure 6:
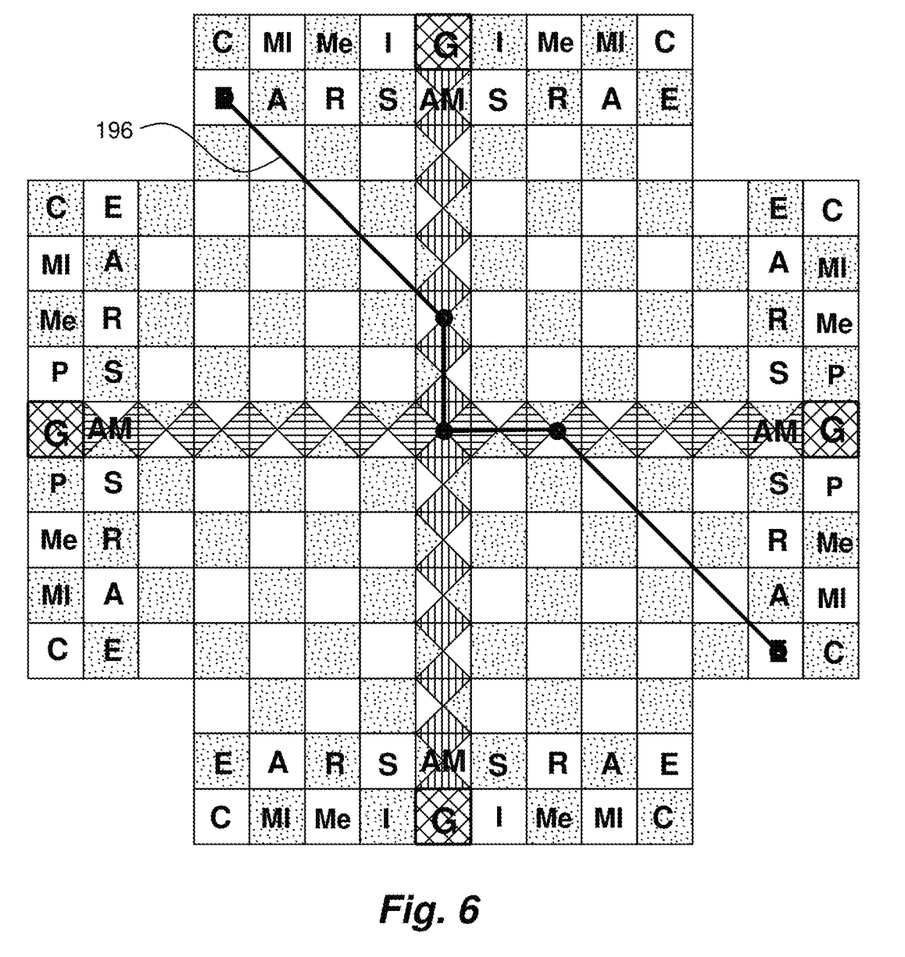
FIG. 6 is a diagrammatic view of an example of movement logic which may apply when a game piece traverses a portion of a universal row from a diagonal direction and can take advantage of the universal center square at the intersection of the pair of universal rows.

As illustrated for example in FIG. 2, universal rows 188 may preferably include a multiplicity of universal squares 120 (more generically, "universal playing positions"), an intersection square 128 (more generically, "intersection playing position") and four universal end squares 188 (more generically, "universal end playing positions") each of which corresponds to a respective panel zone. Universal squares 120 may each comprise a first color portion (e.g., "light" portion) 122, a second color portion (e.g., "dark portion") 124 and a generally opposing pair of universal color portions 126 (depicted herein as striped areas) each of which may represent both light and dark portions. In particular preferred embodiments, the intersection square 128 and the universal end squares 188 can be used as either a light square or dark squares in the movement of game pieces during game play (e.g., like a wild card square). In preferred embodiments, the universal squares 120 represent logic which allows game pieces to traverse discontinuities in the checkerboard pattern presented on the majority of the game board. Examples and implementations of this logic are depicted in FIGS. 5 and 6.

At a conceptual level, each game piece category and configuration is designed to reflect a certain philosophy and/or entity within the global context of the game. The Government piece represents the center of power, the governing body, the Capital, the Imperial City, and or the Senate, and is in control of all of the other pieces. The Ideology piece represents Cathedrals, Mosques, Synagogues, Temples, and or Universities and the belief systems and power associated with those institutions and ideologies that effect governments and countries overtly and covertly. Some examples to include but not limited to teaching of doctrine, indoctrination, missionary work, non-profit organization creation in which all can be overtly or covertly. The Media piece represents the power of the Press, television, movies, and communication in general and its ability to effect governments and countries overtly and covertly. Some examples to include but not limited to are overt actions such as news agencies, breaking headlines, docudramas, advertisements and covert actions such as propaganda, misinformation, information leaks, false reports. The Military piece represents armed services, naval power, Battle Groups, Task Forces and their abilities to effect governments and countries overtly and covertly. Some examples to include but not limited to are overt actions such as missile strikes, invasion forces, blockades, military advisors and covert actions such as raids, coups, intelligence gathering, spying, sabotage. The Corporate piece represents banking & industry power, Consortiums, Syndicates, Conglomerates and their abilities to effect governments and countries overtly and covertly. Some examples to include but not limited to are overt actions such as corporate mergers, expansions, takeovers, free trade, embargos and covert actions such as corporate espionage, money laundering, black marketeering, private armies.

In embodiments, the game board and game pieces may be configured to be represented graphically on a graphical user interface of a computing device, and at least one of the sets of game pieces may be configured to be moved by a respective player by way of the computing device.

Preferred Initial Game Piece Placement

FIG. 1 illustrates preferred initial game piece placement for an embodiment of the method of game play discussed herein. The game pieces are placed on the game board 102 so that each player's game pieces occupy a respective panel zone 106. Further, the institutional pieces 150 within each player set 146 are placed within the institutional row 112 of the respective panel zone. Similarly, the citizen pieces 148 within each player set 146 are placed within the citizen row 114 of the respective panel zone.

In certain preferred embodiments, each player has pieces of a distinctive color, two of the colors being of light hue and two of the colors being dark hue. The two players with the reverse or opposite colored pieces (e.g., white and black) may preferably sit opposite (facing) each other, as would the other set (e.g., red and gold).

With regard to initial placement of the overt and covert marked pieces, in one embodiment of the game method, when placing game pieces on the game board 102 the default rule may require that the covert game pieces must be placed on a dark color squares and the overt pieces must be placed on light color squares at the start of the game (as illustrated, for example, in FIG. 1). Alternative embodiments of the game play method may require the covert game pieces to be placed on light color squares and overt pieces placed on dark color squares at the start of the game. The preferred order of initial game piece placement along the receptive rows (i.e., institutional row 112 and citizen row 114) is depicted in FIG. 1.

General Rules for Game Piece Movement

In preferred embodiments of a method of playing the game, each player, in turn, moves one of their playing pieces from one square on the game board to another according to respective restrictions on the movement capabilities of each game piece. In certain preferred embodiments of the game method, each player may begin by rolling the 4-sided die (or activating an equivalent device), and the player rolling the highest (or lowest) number moves first. Game play may then continue from that point to the next player in a clockwise (or counterclockwise) fashion. During a respective turn (and when otherwise allowed), any player may move one of their playing pieces to a square occupied by an opponent's piece and subsequently thereto, removing the respective opponent's piece as an indication that the opponent's piece has been captured.

Referring to FIGS. 2 and 3, in embodiments, the universal squares 120 and the intersection square 128 may preferably form or track along the horizontal and vertical axis (e.g., 140 and 142) of the game board 102 and may affect certain moves and attacks through them or on them. In embodiments, when any game piece, Institutional or Citizen, is located on a universal square 120, it can be attacked by any game piece that can move to that square in accordance to the respective movement rules of the that piece. FIGS. 5 and 6 provide examples of the allowable movement pathways (194 and 196, respectively) of a respective game piece through universal squares 120 and the intersection square 128. Importantly, the squares residing along the universal rows 118 (e.g., universal squares 120, and intersection square 128) allow for the logical diagonal and horizontal movement of the game pieces across the game board 102 and make it possible for each player to maneuver an odd number of institutional and citizen pieces. Referring to FIG. 5 for example illustration, the trans-universal pathway shown generally at 190 is the functional equivalent of the resulting movement logic shown generally at 192.

By way of example in reference to FIG. 2, a first player movement compass 138 is oriented specifically with respect to its corresponding panel zone (first panel zone 106). The forward direction 130 is the direction toward the panel zone disposed oppositely of the first panel zone 106. The backward direction 132 is back toward the first panel zone 106. The left and right lateral directions 134 and 136, respectively (otherwise referred to herein as horizontal directions) are generally perpendicular to the respective forward direction. Diagonal movement may occur in a direction generally 45 degrees from respective forward or backward directions. It should be understood that each of the other three panel zones has its own movement compass (not shown) which is oriented to the respective panel zone in a manner identical to the relationship between the first panel zone 106 and first movement compass 138 (i.e., with the forward direction toward the opposing disposed panel zone).

Citizen Game Piece Movement and Attack Rules

Referring to FIGS. 2 and 4, in preferred embodiments the first two moves of each citizen piece 148 can only be in the forward direction in relationship to its originating panel zone. After their first two moves, respective citizen pieces 148 can move one square forward, horizontal left or horizontal right. In preferred embodiments, a citizen piece can never move in a manner that would be considered back towards its original starting panel (i.e., backwards). This may otherwise be referred to herein as the "backwards rule."

In certain preferred embodiments, citizen pieces can only attack diagonally, and the diagonally attack cannot violate the backwards rule. When a player's citizen piece is head-to-head with an opposing player's citizen piece they are considered what is known as "en passant" which is used in standard chess.

In particular preferred embodiments, citizens can be captured "from behind" (on the diagonal) by opposing citizens on their flanks. Although citizens still capture in the same fashion (on the diagonals) using this methodology, citizens can attack other game pieces at any diagonal that does not violate the backwards rule for citizens.

In preferred embodiments, when a player's citizen advances to an opponent's panel board and the row that is located farthest from the inner board (Institutional Row) it can be promoted. This is referred to as a "Power Shift" and that piece is promoted in the following manner: the player must verify if the piece is an overt square (light colored), universal square, or covert (dark colored). If the citizen piece is on an overt square, the citizen will be promoted to an overt institutional piece. If the citizen piece is on a covert square, the citizen will be promoted to a covert institutional piece. If the citizen piece is on a universal square, the citizen can be promoted to an overt or covert institutional piece. All citizens' pieces except for the Ambassador can only promote to an institutional piece of the same status (i.e., Agent to Military; Reporter to Media, etc.). Only the Ambassador piece can be promoted to any institutional piece.

Citizen Game Piece Movement and Attack Rules

In preferred embodiments, similarly to a rook in traditional chess, the Corporate piece can move vertically or horizontally one or many squares per turn. Similarly to a knight in traditional chess, the Military piece may move three squares straight (forward or backward) and one left or right, or one square left or right then three squares straight per turn. The Military piece is typically the only piece that jumps through its move and can only attack another piece at the end of its move. Similarly to the bishop in chess, the Media piece can move diagonally one or many squares per turn and can only move on squares that are the same in color as the one during set up. Diagonal passage through universal squares requires the Media piece to remain on its original colored square. Similarly to the queen in traditional chess, the Ideology piece can move in any one direction one square or many squares per turn. When diagonally passing through universal squares the Ideology piece must end it move on same colored square it started its move. Similarly to the king in traditional chess, the Government piece can move in any direction one square per turn.

Player Objectives

In embodiment of the game method in accordance with the present invention, the objective of the game is for a player to destroy, capture or neutralize the Government piece of all other opponents while preventing their own Government piece from being destroyed, captured, or neutralized. Each player defends their own Government piece (or "Capital") against the other three opponents while attempting to win the game by outright destroying, capturing or neutralizing the three enemy governments whenever they become exposed to direct attack by said player's piece. The winner of the game is the last player remaining on the board after all other opponents' Capitals have been destroyed, captured or neutralized during the course of play.

The Threat Rule

In certain preferred embodiments, when a player moves a piece in a position which will allow it to outright attack the Government piece of an opponent in its next move, that player must announce it by saying "Threat." Failing to announce "Threat" will prevent that player from attacking the Government piece under Threat in their next turn. When a player's Government piece is "Threatened" that player must wait until their turn before the player can respond. A player is out of the game if their Government piece is destroyed, captured or neutralized.

A Government piece is considered destroyed when that piece is taken by an opposing player's Overt Institution piece or Overt Citizen piece. The player whose Government piece is taken becomes defeated or "inactive." In preferred embodiments, the effect of this is that the remaining players must roll a four-sided die. Whichever active player rolls the lowest number (or alternatively, highest) will now have control of the defeated player's remaining pieces and can move them during what would have been the turn of the defeated player.

A government piece is considered captured when that piece is taken by an opposing player's Covert Institution piece or Covert Citizen piece. The effect of this is the player who captured outright the government piece will now have control of the defeated player's remaining pieces and can move them during what would have been the turn of the defeated player.

A government piece is considered neutralized when that piece is taken by an opposing player's Overt Institution piece or Overt Citizen piece and the defeated player rolls the lowest number. None of the remaining active players gets control of the defeated player remaining pieces. Rather, those remaining pieces are considered neutralized. This means remaining active players cannot move through the defeated player's remaining pieces but can capture them to remove them from the board.

Illegal Order

In particular preferred embodiments, an illegal order occurs when a player moves one of their pieces while not making an attempt to remove a Threat to its Government piece. That move must be taken back. It is not an illegal order if a player whose Government piece has received a "Threat" moves a piece which in doing so removes the Threat but creates a "Blindside" on an opponent's government piece (as described below).

The Sanctions Rule

In certain preferred embodiments, if during their turn a player can make no legal move even though a Threat has not been imposed on that player's Government piece, that player is considered to be "Under Sanctions" and their turn is skipped but they remain in the game. The player is no longer Under Sanctions when they are able to make a legal move or their Government piece is under Threat. In chess, if you have no legal move then that is checkmate (you're taken out of the game). In preferred embodiments of the present game method, when a player has no legal move available, they are Under Sanctions.

Blindside

In particular preferred embodiments, an exception to the Threat Rule may exist in which it is possible for a Government piece to become exposed to direct attack and be destroyed, captured, or neutralized without "Threat" being announced. This may arise if a player, by moving a piece, inadvertently or deliberately opens up a direct line of attack between any opponent piece and another opponent's Government piece. The player whose piece now has this direct line of attack can attack that exposed player's Government piece when their turn occurs if that opponent's Government piece is still exposed to that attack. This is called a "Blindside Attack."

Team Play

In certain preferred embodiments, team play may be permitted. In team play partners must play across from one another and partners are not allowed to communicate their moves or strategy to each other or warn the other of an ill-advised move. Moreover, the team that destroys, captures or neutralizes one of the other team's Government pieces wins.

All of the components of the game kit 100 described herein, including the game board 102, the die and the game pieces, may be represented in a computer-implemented form of the game (e.g., graphically by way of a GUI on the screen of a computing device). Correspondingly, the game methods described herein may be implemented in physical format or may be performed as computer-implemented methods. Further, non-transitory computer-readable media may contain a set of instructions which, when performed by one or more computer processes, causes or enables one or more of the game methods described herein to be played on one or more respective computing devices.

Certain embodiments of the methods herein may comprise the following steps:
  initially positioning each set of game pieces within a respective one of the panel zones;
  sequentially alternating turns among the players;
  implementing rules of player game piece movement wherein:
    (a) each citizen piece may be moved with respect to its panel zone one playing position per move, the first two moves of each citizen piece being in its forward direction, and the moves thereafter for the respective piece being in either its forward or lateral directions;
    (b) each government piece may be moved with respect to its panel zone in accordance with the standard rules of chess for a king;
    (c) each ideology piece may be moved with respect to its panel zone in accordance with the standard rules of chess for a queen;
    (d) each media piece may be moved with respect to its panel zone in accordance with the standard rules of chess for a bishop;
    (e) each military piece may be moved with respect to its panel zone in accordance with the standard chess rules of chess for a knight;
    (f) each corporate piece may be moved with respect to its panel zone in accordance with standard chess rules for a rook;
  wherein the universal playing positions provide movement logic which allow a localized exception to strict diagonal movement of respective game pieces traversing one of the universal rows.

If any terms are used but not specifically defined herein, those terms may take on their respective meaning as applied in the conventional game of chess. While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A game comprising:
  a game board having a first axis, and a second axis generally perpendicular thereto, an inner zone centered at the intersection of the first and second axes, a first pair of panel zones disposed along the first axis on opposing sides of the inner zone, and a second pair of panel zones disposed along the second axis on opposing sides of the inner zone, the inner zone presenting eighty-one playing positions in a square array, each panel zone presenting twenty-seven playing positions arranged in a three-by-nine rectangular array, the playing positions which extend along the first axis and second axis generally forming respective universal rows which intersect to divide the remaining playing positions into distinct quadrants, the playing positions within each quadrant alternating between having a first color and a second color in a checkerboard pattern, a majority of the playing positions within the universal rows defining universal playing positions; and four sets of eighteen game pieces, each set of game pieces including a subset of institutional pieces and a subset of citizen pieces, each subset of institutional pieces including at least a government piece, an ideology piece, a media piece, a military piece, and a corporate piece, each subset of citizen pieces including at least an ambassador piece, a scholar piece, a reporter piece, an agent piece and an executive piece.

2. A game as defined in claim 1, wherein each universal playing position has a first color portion, a second color portion and two universal color portions, a universal color portion of each universal playing position generally adjoining one of the universal color portions of at least one adjacent universal playing position.

3. A game as defined in claim 1, wherein
each subset of institutional pieces includes one government piece, two ideology pieces, two media pieces, two military pieces and two corporate pieces; and
each subset of citizen pieces includes one ambassador piece, two scholar pieces, two reporter pieces, two agent pieces and two executive pieces.

4. A game as defined in claim 3, wherein:
(a) within each subset of institutional pieces,
   (i) one ideology piece, one media piece, one military piece and one corporate piece includes overt markings; and
   (ii) one ideology piece, one media piece, one military piece and one corporate piece includes covert markings; and
(b) within each subset of citizen pieces,
   (i) one scholar piece, one reporter piece, one agent piece and one executive piece includes overt markings; and
   (ii) one scholar piece, one reporter piece, one agent piece and one executive piece includes covert markings.

5. A game as defined in claim 1, further comprising a 4-sided die.

6. A game as defined in claim 1 wherein the game board and game pieces are configured to be represented graphically on a graphical user interface of a computing device, and at least one of the sets of game pieces is configured to be moved by a respective player by way of the computing device.

* * * * *